Sept. 20, 1949.　　　　　　S. ALLEN　　　　　　2,482,144
SLOTTED SPECTACLE FRAME

Filed April 26, 1947.　　　　　　　　　2 Sheets-Sheet 1

INVENTOR
Samuel Allen
BY
ATTORNEY

Sept. 20, 1949.                    S. ALLEN                        2,482,144
                            SLOTTED SPECTACLE FRAME
Filed April 26, 1947                                            2 Sheets-Sheet 2
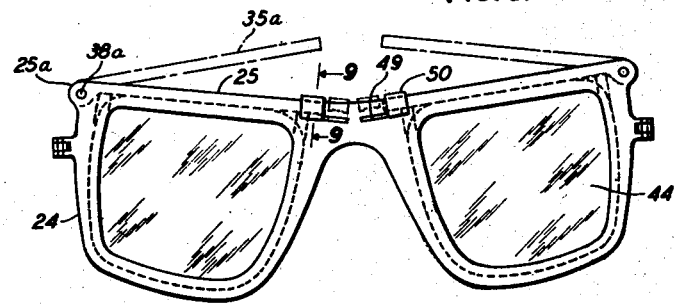
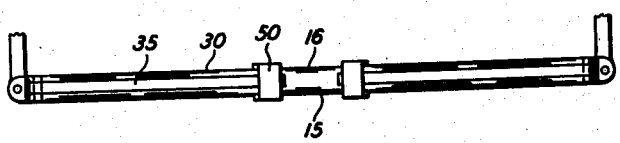
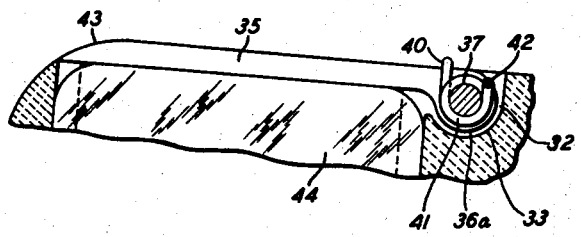
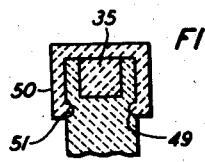
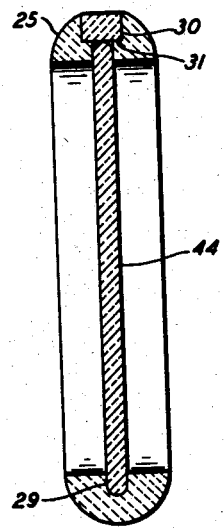
INVENTOR
Samuel Allen
BY
ATTORNEY Patented Sept. 20, 1949

2,482,144

UNITED STATES PATENT OFFICE 2,482,144

SLOTTED SPECTACLE FRAME

Samuel Allen, New York, N. Y.

Application April 26, 1947, Serial No. 744,074

1 Claim. (Cl. 88—47)

This invention relates to ophthalmic mountings. It is particularly directed to ophthalmic mountings provided with removable lenses.

An object of this invention is to provide ophthalmic mountings compromising a frame formed with slots through which lenses may be inserted or removed, and highly improved means to releasably retain the lenses in the frames.

Another object of this invention is to provide an ophthalmic mounting having slots in the lens holder through which the lenses may be inserted into said holders and pivoted arms resiliently urged to position for closing said slots for retaining said lenses within said holders, said arms being swingable to positions uncovering said slots to permit removal and replacement of said lenses.

Yet another object of this invention is to provide a strong, rugged and durable eyeglass which shall be relatively inexpensive to manufacture, easy to manipulate, attractive in appearance and yet practical and efficient to a high degree in use.

Other objects of this invention are:

Fig. 5 is a view similar to Fig. 1 but illustrating a modified construction;

Fig. 6 is a top plan view of the structure shown in Fig. 5;

Fig. 7 is a cross-sectional view taken on line 7—7 of Fig. 4;

Fig. 8 is an enlarged cross-sectional view taken on line 8—8 of Fig. 1; and

Fig. 9 is a section on line 9—9 of Fig. 5.

Figure 1:
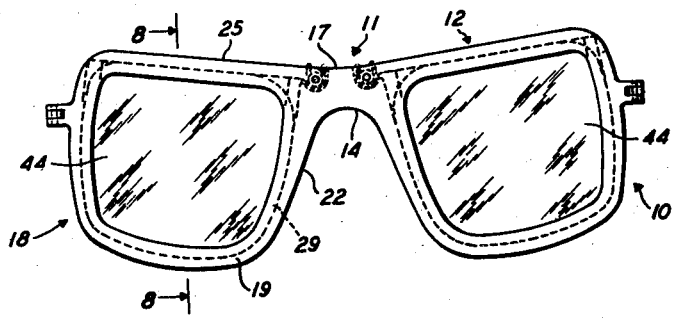
Fig. 1 is a front elevational view of eyeglasses embodying the invention.
Figure 2:
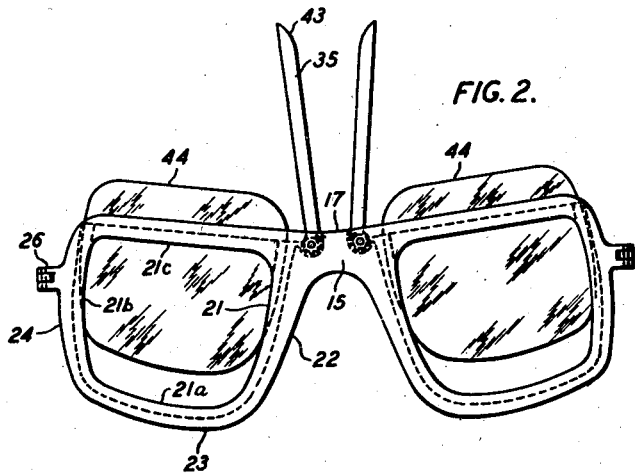
Fig. 2 is a view similar to Fig. 1 but showing the lenses partially out of the eyeglass frame.
Figure 3:
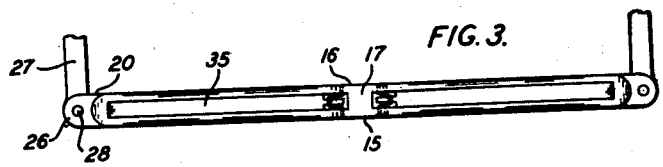
Fig. 3 is a top plan view of the structure shown in Fig. 1.
Figure 4:
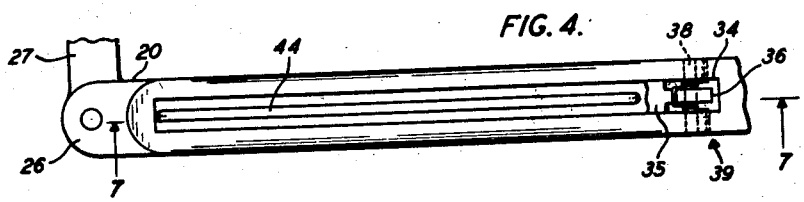
Fig. 4 is an enlarged view of part of the structure shown in Fig. 3, with the cover member broken away.

Referring in detail now to the drawing, 10 designates an ophthalmic mounting embodying the invention. The same comprises a central bridge portion 11 from which extend on either side thereof lens receiving rim portions 12. The bridge portion 11 comprises a wall 13 having the usual curved lower edge 14 which constitutes a nose rest, a front face 15, a rear face 16 and an upper edge 17.

The lens receiving rim portions 12 are of a shape comparable to the lens to be inserted therein and comprise annular wall portions 18 which are integrally connected to the bridge portion 11. The annular wall portions 18 comprise an outer face 19, an inner face 20, a top inner edge 21 and interconnected thereto side inner edge 21a, bottom inner edge 21b and side inner edge 21c. The annular wall portions 18 further comprise outer edges 22 extending from the lower edge 14 of the bridge portion, and interconnected thereto successively, lower outer edges 23, side outer edges 24 and top outer edges 25 which merge with the upper edge 17 of the bridge portion 11. Attaching lugs 26 extend from the outer edges 24 for pivotally receiving temple bars 27 which are secured thereby by pivot pins 28.

The circumferential edges 21, 21a, 21b and 21c of the rims 12 are formed with a continuously extending groove 29. The upper edge 25 of the rims is formed with a rectangular shaped slot 30 which communicates with the groove 29 extending inwardly from the inner edge 21c. The width of the groove 29 is less than the width of the slot 30, thereby forming shoulder portions 31. The inner ends of the slots 29 are enlarged to form recesses 32 having curved rear wall portions 33 and side walls 34.

Means are provided to cover the slots 30 and to this end there are provided elongated cover members 35 of a shape to conform to the slots 30 and adapted to be supported on the shoulders 31 of the slots. The upper surfaces of the members 35 lie substantially flush with the upper edge 25 of the rims 18. The members 35 comprise an end portion of reduced thickness 36 and constituting an attaching lug, having curved portions 36a conforming to the shape of the recess 32. The end portion 36 is formed with a transverse through opening 37 receiving therein a pivot rim 38 spanning the recess 32 and having its end portions grounded in the walls 34.

Spring means 39 for biasing the cover members 35 in a normally closed position are provided. The same comprises a coiled spring wire having a U-shaped control portion 40 which straddles the upper edge and sides of the lug 36. The legs of the U-shaped control portion 40 of the spring are extended towards the pin 38, and comprise a coiled section 41 embracing the pin 38, as shown in Fig. 7. The ends of the coiled section 41 are extended to form outwardly turned portions 42 which are grounded in suitable openings in the walls 34 adjacent the pin 38. It will be apparent that the spring means 39 constitutes a tension spring for bracing the pivoted cover members 35 in a normally closed position. The outer ends 43 of the member 35 are suitably curved to conform with the curved upper end portion of the outer edges 24 of the rims 18.

It will be apparent that lenses 44 may be readily inserted or removed from the rim portions 18 of the ophthalmic mounting by opening the pivoted cover members 35 and either inserting or removing the lenses through the slots 30. When the lenses have been inserted, the spring members 39 will maintain the covers 35 in their closed position.

In Figs. 5 and 6, is shown an ophthalmic mounting 10a embodying the invention and illustrating a modified construction. The mounting 10a comprises a central bridge portion 11 and lens receiving portions 12a. The lens receiving portions 12a are similar to that previously described except that cover members 35a are pivoted from the outer ends of the rim portions rather than the inner ends, as previously described, and the spring members 39 are omitted. To this end, the intersecting upper edge 25 and the side edge 24 of the rims comprise outwardly extending lug portions 35a on which are grounded pivot pins 38a to which is secured the outer end of the cover members 35a. Means are provided to maintain the pivoted cover members 35a in a closed position and to this end the wall 13 of the bridge portion 11 is formed with a pair of aligned grooves 49 on the faces 15 and 16. A U-shaped, locking member 50 is slidably mounted in a straddling position over the upper edge 17 of the wall 13. The lower ends of the legs of the U-shaped member 50 comprise in turn portions 51 receivable in the grooves 49. The grooves 49 extend on either side of the inner end of the slot 30 and permit the movements of the locking member 50 into and out of engaging relationship with the end portion of the cover member 35a, as shown in Fig. 5. In this embodiment the lenses 44 may be inserted or removed from the lens receiving portion of the mounting by sliding the locking members 50 inwardly thereby releasing the cover members 35a. The cover members may then be pivoted to their open position thereby permitting the insertion or removal of lenses from the lens receiving portion of the mounting. When the cover members are pivoted into their closed position, the locking members are slid outwardly thereby engaging the ends of the cover members 35a in their locking position.

I claim:

An ophthalmic mounting comprising lens-receiving rims connected by a bridge, said rims having upper and lower portions connected by inner and outer side portions, each rim being formed with a groove extending along inner sides of its lower portion and its end portions, the upper portions of said rims being formed with longitudinally extending slots having their ends communicating with ends of the grooves, upper portions of the slots being widened with respect to the grooves and forming channels having lower portions forming shoulders extending along and projecting laterally from sides of the slots, lenses fitted into said rims through the slots and having marginal edge portions seated in the grooves and their upper portions engaged in the slots, retainer bars extending longitudinally of the upper portions of the rims and pivotally mounted for vertical swinging movement from a raised position allowing insertion of the lenses to a lowered position in which they fit into the channels with their lower bars resting upon the shoulders and bearing against upper edges of the lenses to hold the lenses against upward movement in the rims, and springs urging the retainer bars downwardly into the channels and holding the bars in pressing engagement with the lenses.

SAMUEL ALLEN.

REFERENCES CITED

The following references are of record in the file of this patent:

UNITED STATES PATENTS

| Number | Name | Date |
| --- | --- | --- |
| 901,394 | Slevin | Oct. 20, 1908 |
| 1,285,225 | King | Nov. 19, 1918 |
| 1,454,327 | Malcom | May 8, 1923 |
| 1,986,688 | Thiele | Jan. 1, 1935 |
| 2,362,002 | Gluck | Nov. 7, 1944 |